US008694815B2

(12) United States Patent
Itoh et al.

(10) Patent No.: US 8,694,815 B2
(45) Date of Patent: Apr. 8, 2014

(54) POWER SUPPLY CONTROL APPARATUS, IMAGE PROCESSING APPARATUS, STORAGE MEDIUM STORING POWER SUPPLY CONTROL PROGRAM

(75) Inventors: Hidenori Itoh, Kanagawa (JP); Masafumi Ono, Kanagawa (JP); Mitsunobu Mamiya, Kanagawa (JP); Noriyuki Obara, Kanagawa (JP); Ken Naoe, Kanagawa (JP); Yuji Murata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 565 days.

(21) Appl. No.: 12/962,412

(22) Filed: Dec. 7, 2010

(65) Prior Publication Data

US 2011/0320845 A1 Dec. 29, 2011

(30) Foreign Application Priority Data

Jun. 25, 2010 (JP) ................................. 2010-145231

(51) Int. Cl.
*G06F 1/26* (2006.01)
*G06F 1/32* (2006.01)

(52) U.S. Cl.
USPC ........... 713/330; 713/300; 713/320; 396/129; 396/221; 396/303

(58) Field of Classification Search
USPC ........... 713/300, 320, 330; 396/129, 221, 303
See application file for complete search history.

(56) References Cited

U.S. PATENT DOCUMENTS

| 6,104,886 | A | * | 8/2000 | Suzuki et al. | ................. 396/429 |
| 8,321,692 | B2 | * | 11/2012 | Mikami et al. | ................ 713/300 |
| 2007/0005723 | A1 | * | 1/2007 | Kato | ............................. 709/217 |
| 2007/0206211 | A1 | | 9/2007 | Okutsu et al. | |

FOREIGN PATENT DOCUMENTS

| JP | 2007-194876 A | 8/2007 |
| JP | 2007-334094 A | 12/2007 |
| JP | 2008-219573 A | 9/2008 |

* cited by examiner

*Primary Examiner* — Mohammed Rehman
*Assistant Examiner* — Michael J Brown
(74) *Attorney, Agent, or Firm* — Sughrue Mion, PLLC (57) ABSTRACT

A power supply control apparatus that includes an instruction component, an execution component and a power supply control component is provided. The power supply control component is equipped with at least two measurement functions that have different measurement durations for cases in which the duration until interrupting the power supply to device(s) is measured, wherein measurement is activated with a first measurement function of relatively long measurement duration at a completion time of prior image processing, and measurement is activated with a second measurement function of relatively short measurement duration for device(s) to which power is being supplied at the time of completion of the prior image processing but which are not required in later image processing.

8 Claims, 7 Drawing Sheets

FIG.6A PRESENT EXEMPLARY EMBODIMENT

FIG.6B COMPARATIVE EXAMPLE 1

FIG.6C COMPARATIVE EXAMPLE 2

FIG.7

POWER SUPPLY CONTROL APPARATUS, IMAGE PROCESSING APPARATUS, STORAGE MEDIUM STORING POWER SUPPLY CONTROL PROGRAM

CROSS-REFERENCE TO RELATED APPLICATIONS

This application is based on and claims priority under 35 USC 119 from Japanese Patent Application No. 2010-145231 filed on Jun. 25, 2010.

BACKGROUND

1. Technical Field

The present invention relates to a power supply control apparatus, an image processing apparatus, and a storage medium in which a power supply control program is stored.

2. Related Art

There exist techniques that give a selected function priority to activate when switching power on, that supply power only function units that are selected when activating and that provide an image scanning apparatus and an image forming apparatus individual separate power save transition timers.

SUMMARY

An aspect of the present invention is a power supply control apparatus that comprises: an instruction component for instructing image processing that selectively operates a plurality of devices; an execution component that operates selected device(s) according to the image processing instructed with the instruction component and executes image processing; and a power supply control component that controls so as to independently supply power or interrupt power supply to each of the device(s) for operation according to the image processing that has been instructed by the instruction component, the power supply control component being equipped with at least two measurement functions that have different measurement durations for cases in which the duration until interrupting the power supply to the device(s) is measured, wherein measurement is activated with a first measurement function of relatively long measurement duration at a completion time of prior image processing, and measurement is activated with a second measurement function of relatively short measurement duration for device(s) to which power is being supplied at the time of completion of the prior image processing but which are not required in later image processing.

BRIEF DESCRIPTION OF THE DRAWINGS

Exemplary embodiments of the present invention will be described in detail based on the following figures, wherein:

FIG. 6A to FIG. 6C are timing charts relating to power save and reverting from power save in image processing apparatuses, FIG. 6A is of the present exemplary embodiment, and FIG. 6B and FIG. 6C are of Comparative Examples.

DETAILED DESCRIPTION

First Exemplary Embodiment

Figure 1:
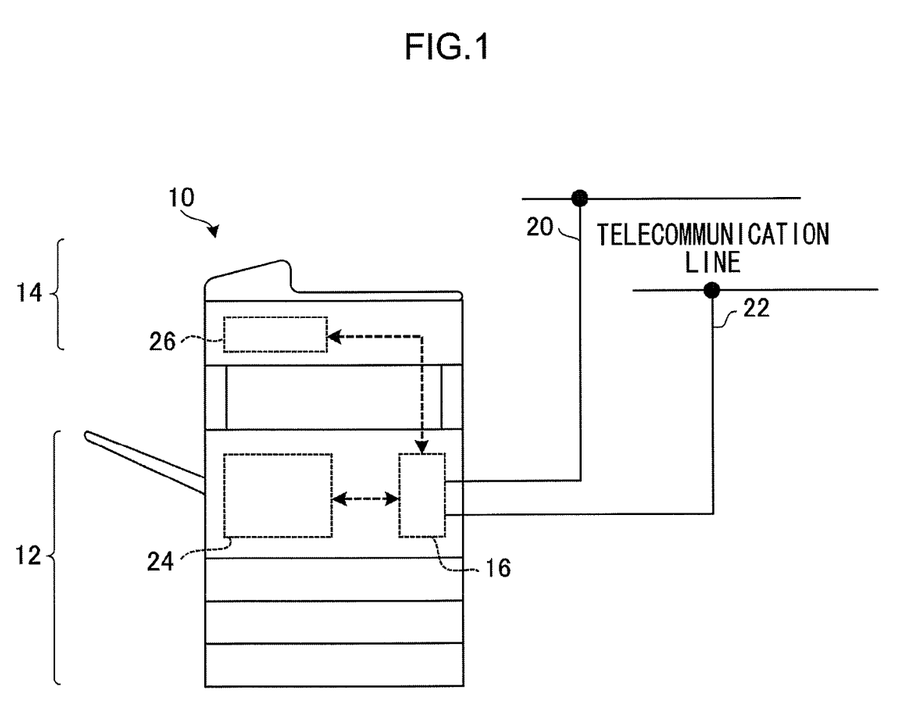
FIG. 1 is a schematic diagram of an image processing apparatus according to a first exemplary embodiment.

FIG. 1 shows an image processing apparatus 10 according to a first exemplary embodiment. The image processing apparatus 10 includes an image forming section 12 that forms an image on recording paper and an image scanning section 14 that scans in an original image. The image processing apparatus 10 includes a main controller 16 that is connected to an image forming control section 24 of the image forming section 12, and an image scanning control section 26 of the image scanning section 14. The main controller 16 is configured so as to control the image forming control section 24 and the image scanning control section 26, temporarily store image data of an original image that has been scanned in by the image scanning section 14, and transmit the image data to the image forming section 12.

A network communication line 20, such as, for example, the Internet, and a telecommunication network line 22 are respectively connected to the main controller 16. The main controller 16 is, for example, connected to a host computer via the network communication line 20, and takes on the role of receiving image data, and executing facsimile receipt and facsimile transmission via the telecommunication network line 22.

The image forming section 12 includes a photoreceptor, and, around the periphery of the photoreceptor, is provided with a charging device that uniformly charges the photoreceptor, a scanning exposure section that scans a light beam based on image data, an image developing section that develops an electrostatic latent image formed by scanning exposure using the scanning exposure section, a transfer section that transfers the image developed on the photoreceptor onto recording paper, and a cleaning section that cleans the surface of the photoreceptor after transfer. A fixing section is also provided, on the conveying path of the recording paper, for fixing the image on the recording paper after transfer.

The image scanning section 14 is provided with an original platen for positioning an original, a scanning drive system for scanning and illuminating light onto an image of an original placed on the original platen, and a photoelectric conversion element, such as a CCD, for example, for converting received light reflected or transmitted by scanning with the scanning driving system into an electrical signal.

Figure 2:
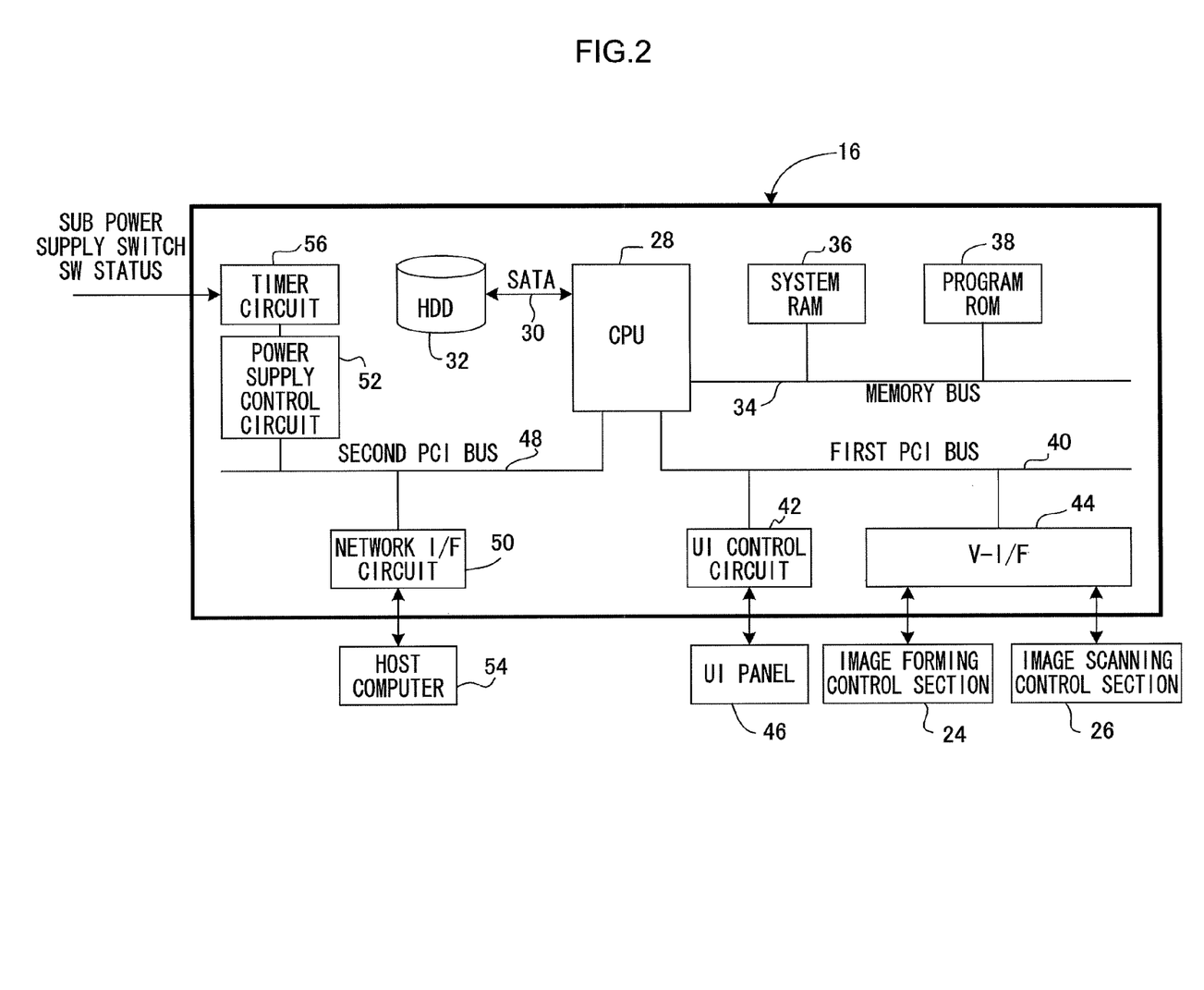
FIG. 2 is a hardware configuration diagram of a main controller according to the first exemplary embodiment.

FIG. 2 is a detail configuration diagram of the main controller 16.

In the main controller 16 each of the configured hardware components centered around a CPU 28 are connected together by buses.

Namely, a Hard Disk Drive (HDD) 32 is connected to the CPU 28 via a SATA line 30.

System RAM 36 and program ROM 38 are connected to the CPU 28 via a memory bus 34.

A User Interface (UI) control circuit 42 and a Video Interface circuit (V-I/F) 44 are connected to the CPU 28 via a first PCI bus 40.

A UI panel 46 is connected to the UI control circuit 42, and the image forming control section 24 and the image scanning control section 26 are connected to the V-I/F 44.

A network I/F circuit 50 and a power supply control circuit 52 are connected to the connected to the CPU 28 via a second PCI bus 48. A host computer 54 is connected to the network I/F circuit 50. A timer circuit 56 is connected to the power supply control circuit 52 such that a sub power supply switch status signal is also input thereto.

Explanation follows regarding the sub power supply switch status signal.

In the first exemplary embodiment, with the objective of reducing power consumption of the image processing apparatus 10, configuration is made such that, when not in operation and also predetermined conditions have been satisfied, power supply is interrupted to each device (including, in the main, the image forming section 12 and the image scanning section 14) except for the main controller 16 (note that configuration may be made such that in addition the main controller 16 is only operated to the minimum extent necessary by stored power, such as battery power under certain conditions).

Control of the supply of power and the interruption of power supply is performed by the power supply control circuit 52. The power supply control circuit 52 controls power supply or power supply interruption by switching ON or OFF sub power supply switches 82, 84, 86, 88 (see FIG. 3) that are inserted into power supply lines connected to each device, such that when a function for processing is instructed by operation of the UI panel 46 power is supplied to sufficient required devices by receiving the status of the sub power supply switches 82, 84, 86, 88 (a status signal).

Figure 3:
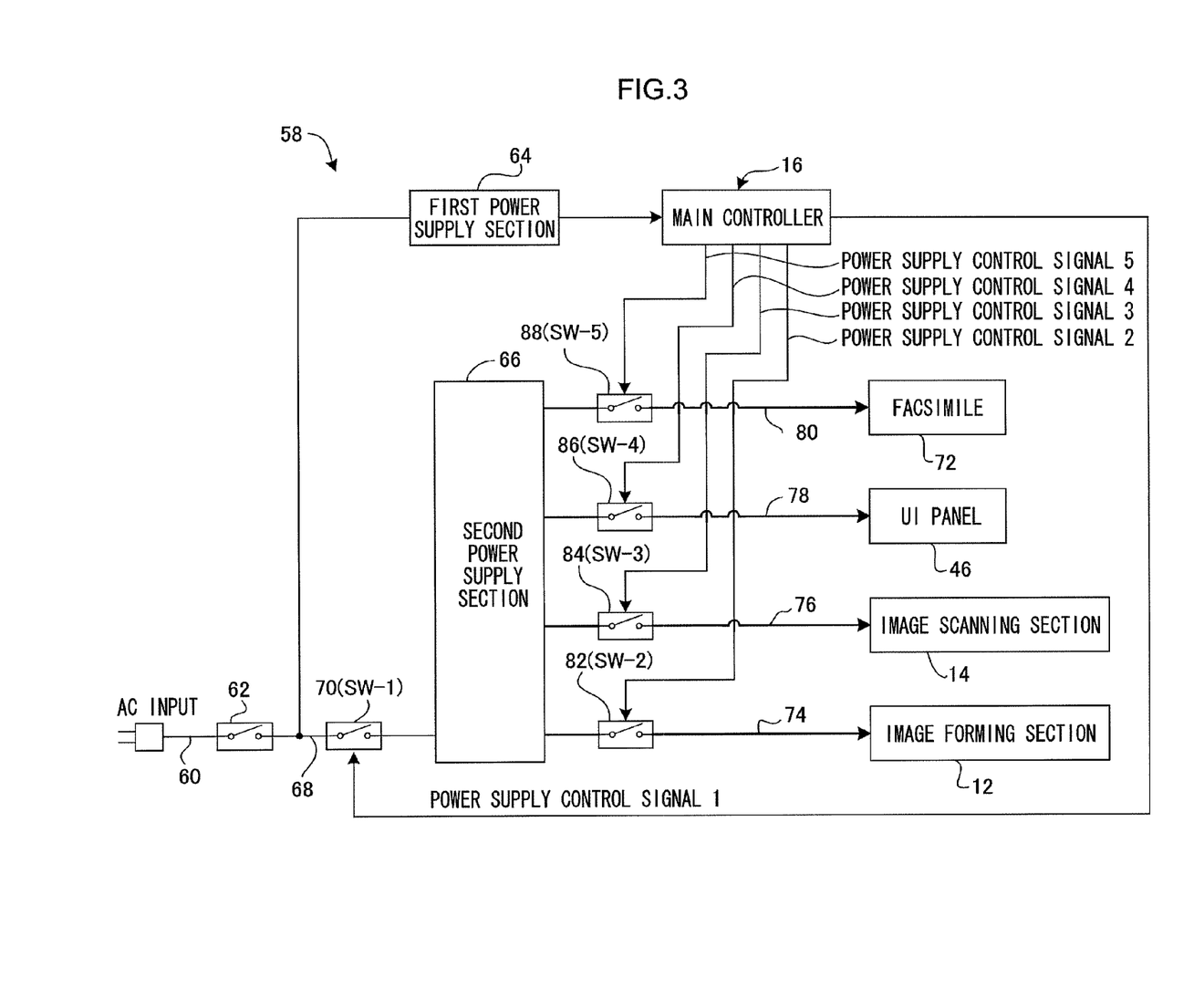
FIG. 3 is a schematic configuration diagram of a power supply control circuit according to the first exemplary embodiment.

FIG. 3 shows a power supply device 58 for executing power supply or power supply interruption to devices according to the main controller 16 (for details see the power supply control circuit 52 of FIG. 2).

A main switch 62 is inserted in a commercial power supply (AC power supply) line 60. Commercial power supply is supplied to a first power supply section 64 and a second power supply section 66 of the power supply device 58 by the main switch 62 being switched ON.

The first power supply section 64 is connected to the main controller 16. The main controller 16 therefore always receives the commercial power supply.

However, the first sub power supply switch 70 (referred to below as "SW-1") is inserted into a power supply line 68 connected to the second power supply section 66. The SW-1 is connected to the main controller 16 (the power supply control circuit 52). The main controller 16 ON-OFF controls the SW-1 (power supply control signal 1).

The second power supply section 66 supplies power to each device (the image forming section 12, the image scanning section 14, the UI panel 46 and a facsimile 72) using separate respective power supply lines 74, 76, 78, 80.

A second sub power supply switch 82 (sometimes referred to below as "SW-2") is inserted in the power supply line 74, a third sub power supply switch 84 (sometimes referred to below as "SW-3") is inserted in the power supply line 76, a fourth sub power supply switch 86 (sometimes referred to below as "SW-4") is inserted in the power supply line 78, and a fifth sub power supply switch 88 (sometimes referred to below as "SW-5") is inserted in the power supply line 80.

The switches SW-2 to SW-5 are respectively connected to the main controller 16 (to the power supply control circuit 52). The main controller 16 ON-OFF controls the SW-2 to SW-5 (power supply control signals 2 to 5). Note that with respect to the UI panel 46, in the first exemplary embodiment, when power supply is switched OFF for a display system (such as, for example, backlight for a touch panel, illumination light sources for hard keys and the like), the input system for a touch panel and the operation of hard keys is always effective.

Figure 4:
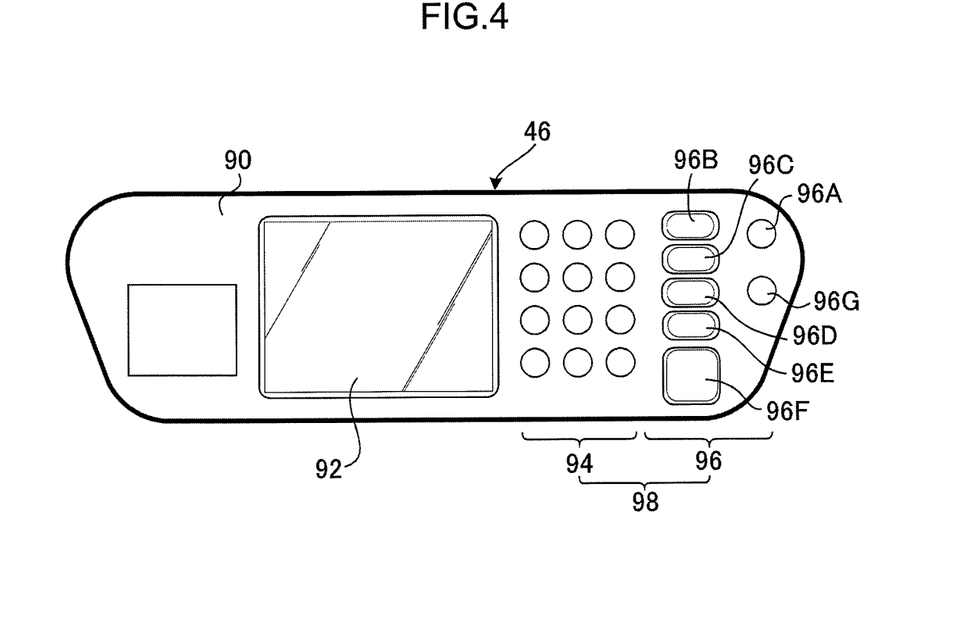
FIG. 4 is a front face view of a UI panel of an image processing apparatus according to the first exemplary embodiment.

FIG. 4 shows an example of the UI panel 46, in which a touch panel section 92 is disposed substantially at the center of a base plate 90 that is long in the horizontal direction. The touch panel section 92 is provided with superimposed input system and output system, with operation input regions set by software, and the functions of the operation input regions displayed. The touch panel section 92 is also provided with a backlight, not shown in the drawings, making the display contents easier to see, particularly when the display system is a liquid crystal display device.

A hard key unit 98 is provided at the right hand side of the touch panel section 92 in FIG. 4, on which a ten key 94 and function keys 96 have been consolidated. The hard key unit 98 is, as the name suggests, a unit for inputting instructions by physical press-operation, in contrast to the touch panel section 92. Recently there are also examples in which a transmission light source illuminates each of the hard key operation keys.

In the hard key unit 98, at least the following keys are provided: function instruction keys 96B, 96C, 96D, 96E, for instructing each of respective functions, these being a facsimile function, an image reading (scan) function, an image reproduction (copy) function, and an image forming (print) function; a start key 96F for starting each of the functions; and a stop key 96G for stopping each function.

A power save key 96A is provided in the hard key unit 98, and by operation of the power save key 96A on its own, a first sub power supply switch (SW-1) 70 adopts the OFF state, so as to enter power save mode. The SW-1 adopts the ON state when the power save key 96A is operated while in the power save mode, thereby reverting to the normal mode.

However, as stated above, in the first exemplary embodiment, configuration is made such that power supply is automatically interrupted to each device (the devices to which power supply is controlled by sub power supply switches being ON or OFF) when each device is not in operation and predetermined conditions are satisfied.

Such predetermined conditions are timer durations, and basically a first measurement duration T1 is set on the basis of emphasizing the ease-of-use.

Namely, when a device is in a non-operation state, the main controller 16 switches the first sub power supply switch 70 off when the first measurement duration T1 has elapsed.

In the first exemplary embodiment, by providing the SW-2 to SW-5, when during power save mode execution of a particular function is desired, power supply is controllable such that power supply is only made to the devices necessary for this particular function. Namely, during power save mode, by switching the SW-1 ON when only the sub power supply switches of the particular function are in the ON state, a state is adopted in which power not supplied to the other devices (partial power save mode).

Furthermore, in the first exemplary embodiment, in addition to the first measurement duration T1, the timer circuit 56 (see FIG. 2) is also provided with a second measurement duration T2 on the basis of emphasizing power saving effect.

Detailed explanation now follows regarding the first measurement duration T1 and the second measurement duration T2 for setting in the timer circuit 56.

The timer circuit 56 is set with a measurement duration within a predetermined permissible range.

This permissible range is: Tmin<set measurement duration T1 or T2<Tmax, wherein Tmin is the shortest measurement duration and Tmax is the longest measurement duration.

Configuration may be made such that setting of the measurement duration T1 or T2 is, for example, freely settable by a user, or settable at the manufacturing stage and then fixed (not settable).

Since the shortest measurement duration Tmin is naturally the shortest of the measurement durations, power supply is interrupted early, and it is a measurement duration in the timer circuit 56 with extreme emphasis on power save effect.

However, since the longest measurement duration Tmax is naturally the longest of the measurement durations, power supply is continued in order to enable rapid response to the next processing, and it is a measurement duration in the timer circuit 56 with extreme emphasis on ease-of-use.

As the setting sequence, first the first measurement duration T1 is set. Namely, the first measurement duration T1 satisfies Tmin<measurement duration T1<Tmax.

The second measurement duration T2 is then set, however, since this measurement duration is less than at least the measurement duration T1, the measurement duration T2 satisfies Tmin<measurement duration T2<measurement duration T1.

As a result, measurement duration T1 and measurement duration T2 are set so as to maintain the relationship Tmin<measurement duration T2<measurement duration T1<Tmax.

While, in the extreme, configuration may be made such that measurement duration T1=Tmax and measurement duration T2=Tmin, according to the conditions of use of the image processing apparatus by a user cases arise when this is not optimal, such as, for example, cases where it is clear from analysis of the usage conditions that the usage frequency of the image scanning section 14 tend to be high, and it is hence necessary in relation to the image scanning 14 to set such that the measurement duration T2 is shifted towards Tmax to emphasis ease-of-use.

Explanation follows regarding the operation of the first exemplary embodiment.

Figure 5:
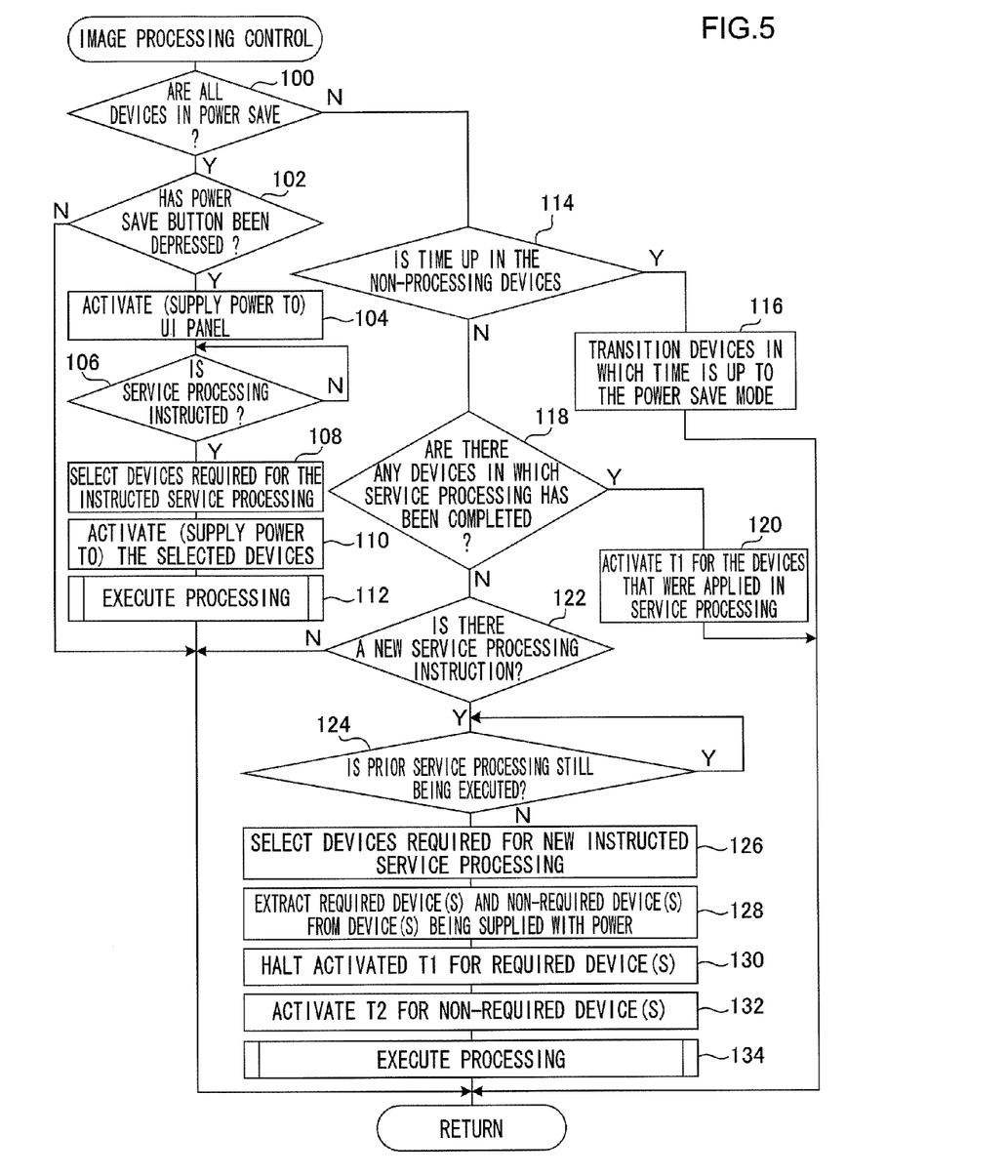
FIG. 5 is a flow chart showing a power supply control routine in image processing according to the first exemplary embodiment.

FIG. 5 is a flow chart showing a power supply control routine in image processing.

In step 100, determination is made as to whether or not all of the devices are in power save. When affirmative determination is made processing proceeds to step 102 and determination is made as to whether or not the power save button has been depressed. The current routine is ended when negative determination is made at step 102. When affirmative determination is made at step 102, processing proceeds to step 104, and power supply to the UI panel 46 is activated.

At the next step 106, determination is made as to whether or not service processing has been instructed. When affirmative determination is made, processing proceeds to step 108 and the device(s) required for the instructed service processing are selected. While detailed explanation will not be given, the UI panel 46 is transitioned back to the power save mode when the UI panel 46 is activated and there is no operation thereof within a predetermined duration.

In the next step 110, power supply is activated for the selected devices, processing proceeds to the next step 112, the instructed service processing is executed, and the current routine is ended.

When negative determination is made at step 100, such as, for example, during service processing of step 112 and after the service processing has been completed, processing proceeds to step 114 since power is being supplied to some or all of the devices.

At step 114, determination is made as to whether or not time is up in the non-processing devices. Namely, configuration is made such that when service processing is completed a timer (T1 or T2), described below, is activated, and determination is made at step 114 as to whether or not time is up in activated timer(s).

When affirmative determination is made at step 114, processing proceeds to step 116, and the devices in which time is up are transitioned to power save mode, and the current routine is ended.

When negative determination is made at step 114, processing proceeds to step 118, and determination is made as to whether or not there are devices which have completed service processing at the present point in time.

When affirmative determination is made at step 118, processing proceeds to step 120 and the timer T1 is activated for the devices for which service processing has been completed, and the current routine is ended.

When negative determination is made at step 118, determination is made as to whether or not there are any devices for which both power is being supplied and a timer (T1 or T2) is activated, then processing proceeds to step 122.

At step 122, determination is made as to whether or not there is an instruction for new service processing, and when negative determination is made the current routine is ended.

When affirmative determination is made at step 122, processing proceeds to step 124 and determination is made as to whether or not the service processing instructed prior to the newly instructed service processing is still being executed. Note that there are cases when the new service processing is referred to as "later service processing" and the service processing being executed is referred to as "prior service processing".

At step 124, when determined that the previous service processing (prior service processing) is not still being executed (i.e. it has been completed), processing proceeds to step 126, and the devices required for the new instructed service processing (later service processing) are selected. Processing then proceeds to step 128 and any devices that are being supplied with power that are required for the later service processing (referred to below as "required devices") and any devices that are being supplied with power and are not required for the later service processing (referred to below as "non-required devices") are extracted, and processing proceeds to step 130.

At step 130, the activated timer T1 for the required devices is halted, processing then proceeds to step 132 and for the non-required devices both the activated timer T1 is halted and the timer T2 is activated, then processing proceeds to step 134.

At step 134, the later service processing is executed, and the current routine is ended.

In the first exemplary embodiment, timers (T1 or T2) of different measurement durations are independently settable for each of plural devices, and when the later service processing is not yet determined, when the prior service processing is completed for the device(s) applied in the prior service processing, the relatively long timer T1 is activated for each, and when later service processing is instructed while the timer T1 is still activated, the activated timer T1 for the each of the required device(s) for the succeeding later service processing is halted by determining whether or not the device(s) will be applied therefor. Then, for non-required devices for the later service processing, the activated timer T1 is halted and the timer T2 of shorter measurement duration than the timer T1 is newly activated. As a result, an earlier transition of the non-required devices to power save mode is achieved than in cases in which a single timer is used, and power supply continues to the device(s) that might be required in the next service processing (the later service processing), so as to raise the ease-of-use.

Figure 6A:
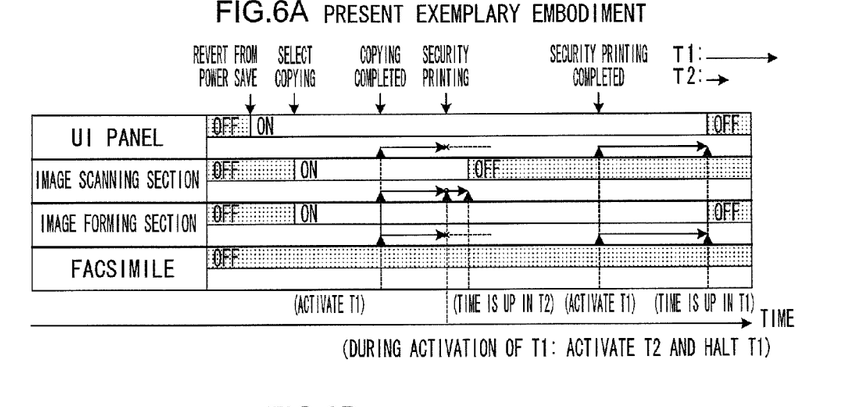
Figure 6B:
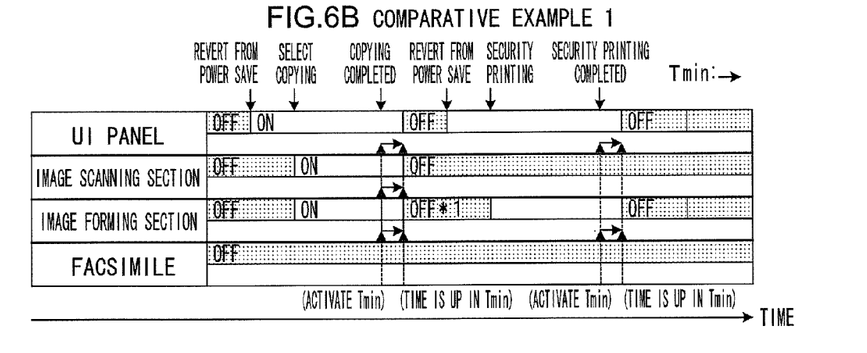
Figure 6C:
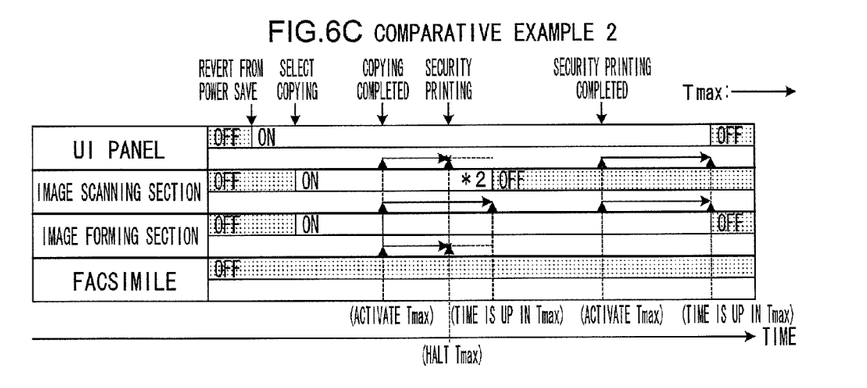

FIGS. 6A to 6C are timing charges showing examples of timer management when there plural service processing is successively performed in the first exemplary embodiment.

First, FIG. 6B and FIG. 6C are validation Comparative Examples.

FIG. 6B is an example (Comparative Example 1) in which a timer (Tmin) of relatively short measurement duration is set as a single timer.

When reverting from a state in which all devices are in power save (by depressing the power save button or the like), power supply to the UI panel 46 is switched ON. Then, when copy processing is selected as service processing, power supply is switched ON to the required devices for this copy processing (the image scanning section 14, the image forming section 12). Then, when execution of the copy processing has been completed, the timer Tmin is activated, and when time is up on the timer Tmin, all of the devices are switched OFF and enter the power save mode.

However, consider a case in which security printing is selected as service processing immediately afterwards. In such a case, first the power is supplied to the UI panel 46 by reverting from power save (such as, for example, by a remote operation activation signal or the like), then when security printing is selected, power supply is switched ON to the required device(s) for security printing (the image forming section 12). Then when execution of security printing has been completed, the timer Tmin is activated, and when time is up on this timer Tmin, all of the devices are switched OFF and enter the power save mode.

Namely, since the power save mode has already been entered immediately after the copy processing when the instruction for security printing arrives, time is required for starting up. Consequently, the Comparative Example 1 has a good power save effect (energy reduction effect), but this results in poor ease-of-use. In other words, if a timer T is short, it enters power save in a short duration before the later image processing (in this example security printing) (see *1), accordingly, this results in poor ease-of-use.

FIG. 6C is an example (Comparative Example 2) in which the time (Tmax) of relatively long measurement duration is set as a single timer.

When reverting from a state in which all devices are in power save (by depressing the power save button or the like), power supply is switched ON to the UI panel 46. Then, when copy processing is selected as service processing, power supply is switched ON to the required devices for this copy processing (the image scanning section 14, the image forming section 12). Then, when execution of the copy processing has been completed, the timer Tmax is activated, and when time is up on the timer Tmax, all of the devices are switched OFF and enter the power save mode.

However, consider a case in which security printing is selected as service processing immediately afterwards. In such a case, first, since the timer Tmax is long and so power remains being supplied to devices as before, when security printing is selected, since power supply continues to the required device(s) for this security printing (the image forming section 12), security printing can be executed straight away. When execution of security printing is complete, the timer Tmax is activated, and when time is up on this timer Tmax, all of the devices are switched OFF and enter the power save mode.

Namely, power continues to be supplied to the device(s) (the image scanning section 14) not required for the security printing instructed immediately after the copy processing, until the Tmax has elapsed. Consequently, the Comparative Example 2 has good ease-of-use, but this results in poor power save effect (energy reduction effect). In other words, if a timer T is long, it continues to supply power to non-required device(s) (in this example, the image scanning section) (see *2), accordingly, this results in poor power save effect (energy reduction effect).

In contrast to the above Comparative Example 1 and Comparative Example 2, the present exemplary embodiment in FIG. 6A realizes control to obtain the advantages of both cases.

As shown in FIG. 6A, when reverting from a state in which all devices are in power save (by depressing the power save button or the like), power supply is switched ON to the UI panel 46. Then, when copy processing is selected as service processing, power supply is switched ON to the required device(s) for this copy processing (the image scanning section 14, the image forming section 12). Then, when execution of the copy processing has been completed, the timer T1 is activated, and when instruction for security printing arrives prior to time being up on the timer T1, the timer T1 is halted for device(s) required for the security printing (the image forming section 12) and power supply thereto is continued. However, the timer T1 is halted for the device(s) not required for security printing (the image scanning section 14) and the new different timer T2 is activated. Configuration may be made such that switching from the timer T1 to the timer T2 in aborted in cases in which the remaining time on the timer T1 is less than T2.

In either case, the window for instructing security printing is increased by the timer T1, and the non-required device(s) enter into the power save mode early due to the timer T2.

When execution of the security printing has been completed, the timer T1 is reactivated, and when time is up on the timer T1, all of the devices are switched OFF and enter the power save mode.

Second Exemplary Embodiment

Figure 7:
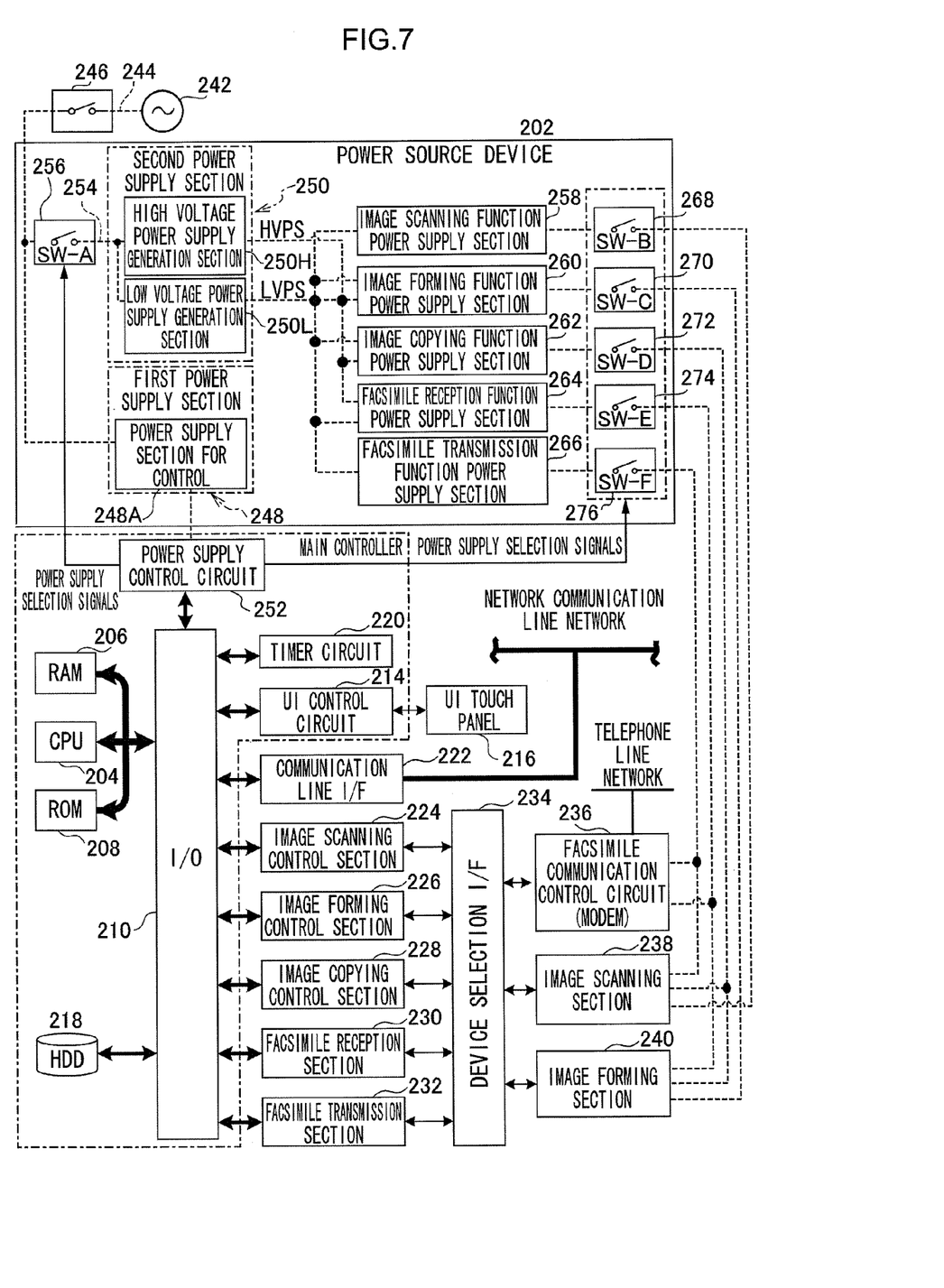
FIG. 7 is a schematic configuration diagram of a main controller and power supply device according to a second exemplary embodiment.

FIG. 7 is a schematic configuration diagram of devices controlled by a main controller 200 of an image processing apparatus according to a second exemplary embodiment, and of the main controller 200 and the power supply lines of a power source device 202 for power supply to each of the devices.

As shown in FIG. 7, the main controller 200 includes a CPU 204, RAM 206, ROM 208, I/O (input/output section) 210 and a bus 212, such as, for example, a data bus or control bus, connecting together these devices. A UI touch panel 216 is connected to the I/O 210 via a UI control circuit 214. A hard disk drive (HDD) 218 is connected to the I/O 210. The functions of the main controller 200 are realized by the CPU 204 operating according to a program stored, for example, on the ROM 208, the HDD 218 or the like. Configuration may be made such that the functions of the main controller (an image processing control section) 16 are realized by operation of the CPU 204 according to a program installed from a recording medium (such as, for example, a CD-ROM, DVD-ROM or the like) on which the program had been stored.

A timer circuit 220 and a communication line I/F 222 are connected to the I/O 210. An image scanning control section 224, an image forming control section 226, an image copying control section 228, a facsimile reception control section 230 and a facsimile transmission control section 232 are connected to the I/O 210, so as to give functionally independent control.

A device selection I/F 234 is connected to the image scanning control section 224, the image forming control section 226, the image copying control section 228, the facsimile reception control section 230, and the facsimile transmission control section 232.

The device selection I/F 234 is connected to each of the devices of a facsimile communication control circuit (modem) 236, an image scanning section 238 and an image forming section 240 so as to select according to control operation executed in the image scanning control section 224, the image forming control section 226, the image copying control section 228, the facsimile reception control section 230 and the facsimile transmission control section 232.

Note the timer circuit 220 is a circuit for performing timing measurement of the initial set duration, or an extended set duration as the trigger for the facsimile communication control circuit 236, the image scanning section 238 and the image forming section 240 being placed in the power save state (a non-power-supplied state).

The main controller 200 and each of the devices (the facsimile communication control circuit 236, the image scanning section 238 and the image forming section 240) are supplied with power from the power source device 202 (see the dotted lines on FIG. 7). Note that while power supply lines are shown on FIG. 7 as a single line, in reality each is two or 3 distribution lines.

An input power supply line 244 leading out from a commercial power supply 242 is connected to a main switch 246. Power supply to a first power supply section 248 and a second power supply section 250 is enabled by the main switch 246 being switched ON.

The first power supply section 248 is equipped with a control power supply generating section 248A connected to a power supply control circuit 252 of the main controller 200. The power supply control circuit 252 supplies power to the main controller 200 and is connected to the I/O 210. The power supply control circuit 252 performs switching control (described below) for conducting or interrupting power supply lines to each of the devices (the facsimile communication control circuit 236, the image scanning section 238, the image forming section 240) according to a control program of the main controller 200.

However, a first sub power supply switch 256 (sometimes referred to below as "SW-A") is inserted in a power supply line 254 for connection to the second power supply section 250. The SW-A is configured so as to be N-OFF controlled by the power supply control circuit 252.

The second power supply section 250 is equipped with a high voltage power supply generation section (HVPS) 250H and a low voltage power supply generation section (LVPS) 250L. The high voltage power supply generation section (HVPS) 250H is mainly used for supplying power to the charging section, the developing section, the transfer section of the image forming section 240.

The high voltage power supply generation section (HVPS) 250H and the low voltage power supply generation section (LVPS) 250L of the second power supply section 250 are selectively connected to an image scanning function power supply section 258, an image forming function power supply section 260, an image copying function power supply section 262, a facsimile reception function power supply section 264, and a facsimile transmission function power supply section 266.

The image scanning function power supply section 258 is connected to the image scanning section 238 via a second sub power supply switch 268 (sometimes referred to below as "SW-B") as the input source of the low voltage power supply generation section (LVPS) 250L.

The image forming function power supply section 260 is connected to the image forming section 240 via a third sub power supply switch 270 (sometimes referred to below as "SW-C") as input source of the high voltage power supply generation section (HVPS) 250H and the low voltage power supply generation section (LVPS) 250L.

The image copying function power supply section 262 is connected to the image scanning section 238 and the image forming section 240 via a fourth sub power supply switch 272 (sometimes referred to below as "SW-D") as input source of the high voltage power supply generation section (HVPS) 250H and the low voltage power supply generation section (LVPS) 250L.

The facsimile reception function power supply section 264 is connected to the facsimile communication control circuit 236 and the image forming section 240 via a fifth sub power supply switch 274 (sometimes referred to below as "SW-E") as input source of the high voltage power supply generation section (HVPS) 250H and the low voltage power supply generation section (LVPS) 250L.

Similarly to the first sub power supply switch 256, the second sub power supply switch 268, the third sub power supply switch 270, the fourth sub power supply switch 272, the fifth sub power supply switch 274, and the sixth sub power supply switch 276 are respectively ON-OFF controlled according to power supply selection signals from the power supply control circuit 252 of the main controller 200.

The facsimile transmission function power supply section 266 is connected to the image scanning section 238 (excluding output, for example, of communication reports and the like) via the sixth sub power supply switch 276 (sometimes referred to below as "SW-F") as input source of the low voltage power supply generation section (LVPS) 250L.

The second exemplary embodiment configured as described above needs only to consume power at the lowest amount necessary due to power being selectively supplied to each of the devices (the facsimile communication control circuit 236, the image scanning section 238, the image forming section 240) on a function separate basis and due to power not being supplied to non-required devices of functions not instructed.

By executing control on a functionally separate basis, a power save state is not readily entered until each of the respective functions is completed, preventing frequent repeated switching between the normal state and power save state that actually leads to inefficient operation. In other words, the current state is maintained and the power save state not entered until processing of the instructed functions is complete.

What is claimed is:

1. A power supply control apparatus comprising:
an instruction component configured to instruct image processing that selectively operates a plurality of devices;
an execution component configured to operate selected device(s) according to the image processing instructed with the instruction component and to execute image processing; and
a power supply control component configured to control so as to independently supply power or interrupt power supply to each of the device(s) for operation according to the image processing that has been instructed by the instruction component, the power supply control component being equipped with a first measurement function and a second measurement function, the first measurement function for measuring a first duration until interrupting the power supply to the device(s) and the second measurement function for measuring a second duration until interrupting the power supply to the device(s), the first duration being longer than the second duration, wherein the first duration of the first measurement function begins at a completion time of a prior image processing, and the second duration of the second measurement function begins at a start time of a later image processing for device(s) to which power is being supplied at the time of completion of the prior image processing but which are not required in the later image processing.

2. The power supply control apparatus of claim 1, further comprising an adjustment component that adjusts the first measurement function and the second measurement function to be within a range from a longest duration for setting with emphasis on ease-of-use to a shortest duration for setting with emphasis on power save effect.

3. The power supply control apparatus of claim 2, wherein the first measurement function is adjusted to the longest duration and the second measurement function is adjusted to the shortest duration.

4. A power supply control apparatus comprising:
an instruction component configured to instruct image processing that selectively operates a plurality of devices;
an execution component configured to operate selected device(s) according to the image processing instructed with the instruction component and to execute image processing;
a control component configured to control so as to independently supply power or interrupt power supply to each of the device(s) for operation according to the image processing that has been instructed by the instruction component;
a first measurement component equipped with a first measurement function activated at a point in time when the image processing has been completed, the first measurement component being configured to measure a first duration until power supply is to be interrupted;
an extraction component that, in response to new image processing being instructed while the first measurement component is still measuring the first duration until power supply is to be interrupt, extracts device(s) that are employed in a prior image processing and will not be employed in a later image processing; and
a second measurement component equipped with a second measurement function activated for the device(s) that have been extracted by the extraction component, the second measurement component being configured to measure a second duration until power supply is to be interrupted, the second duration being shorter in duration than the first duration.

5. The power supply control apparatus of claim 4, further comprising an adjustment component that adjusts the first measurement function and the second measurement function within a range from a longest duration for setting with emphasis on ease-of-use to a shortest duration for setting with emphasis on power save effect.

6. The power supply control apparatus of claim 5, wherein the first measurement function is adjusted to the longest duration and the second measurement function is adjusted to the shortest duration.

7. An image processing apparatus comprising:
an operation component equipped with an operating section configured to instruct image processing from one or other of a scanner function that reads in an original image using an image scanning component, a copy function configured to use an image forming component to form an image on recording paper with image data scanned in by the image scanning component, a print function configured to use the image forming component to form an image on recording paper with image data scanned in by the image scanning component or image data received by an image data transmission and reception component, a facsimile transmission function configured to externally transmit image data scanned in by the image scanning component using the image data transmission and reception component, a facsimile receiving function configured to use the image forming component to form an image on recording paper with image data received by the image data transmission and reception component;
a control component configured to independently control power supply and interruption of power supply to each device applicable to the image processing instructed by operation of the operation section of the operation component out of devices including the image scanning component, the image forming component, and the image data transmission and reception component;
a first measurement component configured to be activated at a point in time when the image processing has been completed and to measure a first duration of time until power supply is to be interrupted;
an extraction component configured to, in response to new image processing being instructed while measurement is still being performed by the first measurement component, extract device(s) that are employed in a prior image processing but will not be employed in a later image processing; and
a second measurement component configured to be activated for the device(s) extracted by the extraction component and to measure a second duration until power supply interruption, the second duration being shorter than the first duration.

8. A non-transitory storage medium readable by a computer, the non-transitory storage medium storing a program of instructions for causing the computer to function as a power supply control apparatus that includes:
an instruction component configured to instruct for image processing that selectively operates a plurality of devices;
an execution component configured to operate selected device(s) according to the image processing instructed by the instruction component and to execute image processing; and
a power supply control component configured to control so as to independently supply power or interrupt power supply to each of the device(s) operated according to the image processing instructed by the instruction component, the power supply control component being component equipped with a first measurement function and a second measurement function, the first measurement function for measuring a first duration until interrupting the power supply to the device(s) and the second measurement function for measuring a second duration until interrupting the power supply to the device(s), the first duration being longer than the second duration,
wherein the first duration of the first measurement function begins at a completion time of a prior image processing, and the second duration of the second measurement function begins at a start time of a later image processing for device(s) to which power is being supplied at the time of completion of the prior image processing but which are not required in the later image processing.

* * * * *